April 20, 1948. W. L. MORGAN ET AL 2,439,983
MEANS FOR THERMALLY EVAPORATING VARIOUS MATERIALS
IN VACUUMS FOR COATING PURPOSES
Filed Jan. 15, 1944 2 Sheets-Sheet 1

INVENTORS
Willard L. Morgan.
Arthur R. Weinrich.
BY Corbett, Mahoney & Miller
ATTORNEYS April 20, 1948.  W. L. MORGAN ET AL  2,439,983
MEANS FOR THERMALLY EVAPORATING VARIOUS MATERIALS
IN VACUUMS FOR COATING PURPOSES
Filed Jan. 15, 1944    2 Sheets-Sheet 2

INVENTORS
Willard L. Morgan.
Arthur R. Weinrich
BY Corbett, Mahoney & Miller

ATTORNEYS

Patented Apr. 20, 1948

2,439,983

UNITED STATES PATENT OFFICE 2,439,983

MEANS FOR THERMALLY EVAPORATING VARIOUS MATERIALS IN VACUUMS FOR COATING PURPOSES

Willard L. Morgan, Columbus, Ohio, and Arthur R. Weinrich, Brackenridge, Pa., assignors to Libbey-Owens-Ford Glass Company, Toledo, Ohio, a corporation of Ohio Application January 15, 1944, Serial No. 518,372

4 Claims. (Cl. 91—12.2)

Our present invention relates to means for thermally evaporating various materials in a vacuum for coating purposes. It has to do, more particularly, with the evaporation of materials such for example as various metals, metallic compounds and other materials for the production of surface coatings on articles such as reflective or low reflection coatings, et cetera.

With previous methods and apparatus for producing coatings on surfaces by thermal evaporation of metal and other materials, it has been generally customary to employ electric heating elements in the form of tungsten coils upon which the material to be evaporated was melted and evaporated and thence deposited onto the surface to be coated. In such old methods and old apparatus for carrying them out as the metal evaporated into all directions there was considerable waste of metal which was particularly undesirable in cases where costly materials such for example as gold and rhodium were being evaporated. In a large number of metals such as silver, gold, copper, lead, tin, zinc and antimony, the metals on melting do not wet and adhere to the electrically heated resistance filaments made from tungsten, tantalum, molybdenum and columbium, which are the practically desirable materials for such filaments. The evaporation of these materials as well as magnesium fluoride and other materials for producing low reflection deposits is thus difficult and often impossible to carry out using such filaments particularly as the amounts of materials which can be applied to such filaments is necessarily very small.

Flat resistance ribbons carrying small depressions and small crucibles heated either by electrical resistance coils wrapped around them or heated by induction heating have also been used but in such cases the object to be coated must be hung horizontally above such evaporating surfaces as they give evaporation deposits only vertically above them. This is very inconvenient where large plates or many plates of glass, plastics, Cellophane, paper, metal or other articles are to be coated.

During the performance of any of these known methods, spitting of the metal or material occurs during the evaporation. Thus, large pieces of the metal or material being evaporated are thrown by sudden explosive boiling over onto the article being coated, causing the coating to be non-uniform and blemished, and the surface of the article to be pitted. This spoilage of the work results in rejection and frequently results in the total loss of the articles being coated, which in the case of optical elements such as lenses, represents a severe loss, due to the cost of making the lens up to this final treatment.

Generally speaking, our invention relates to means for evaporating various materials such as metals, metallic compounds, quartz and the like and other materials to produce uniform surface coatings for various purposes including mirrors and coatings which are of a low reflective character by placing a material or metal in a receptacle having a lid slightly spaced above such receptacle and by applying heat to the receptacle containing the material to cause it to be evaporated and effect a uniform deposition onto the surface of the article or articles to be coated. The receptacles may be heated by electrical resistance or if desired induction heating of the receptacles may be employed. By the use of such a receptacle and superimposed lid the material is desirably forced to evaporate sidewise or downwards and all spitting difficulties are eliminated. Any quantity of material can thus be evaporated and materials which will not wet filaments can thus be evaporated without difficulty. Further materials such as quartz which do not melt and require very high temperatures for sublimation are found to sublime from such chambers rapidly as they are completely surrounded by high temperature radiating walls.

Also in general we prefer to use receptacles and superimposed lids which carry on each member a flange or collar. The flanges on the two members thus form a collimating throat around the outlet from such receptacle and are found to desirably further restrict the deposition of the evaporated materials to the desired area and to avoid wastage of the expensive materials and further permit us to secure a very uniform thickness of deposit.

One of the objects of our invention is to provide improved means for evaporating metals or other materials whereby a uniform distribution of the evaporated metals and other materials is obtained and thus a uniform and even surface coating is produced.

As another object, evaporation of various materials is carried out by our improved apparatus in such manner that the spitting of all such materials on evaporation is eliminated and the expensive wastage of operations and of articles to be coated by such defects are eliminated.

Another object of our invention is to provide improved means for thermally evaporating costly materials by virtue of which the waste of materials is maintained at a minimum due to the fact that the evaporated material is deposited in a predetermined area or areas and that the majority of the molecules or particles of the metal or other material being evaporated is caused to be deposited only upon the surface of the article or articles to which the surface coating is to be applied.

As a further object of our invention there is provided means for coating articles placed at the side or below the evaporating source which thereby increases the convenience and the total amount of product which can be coated in any given sized chamber.

A further object of our invention is to provide improved means whereby greater efficiency in the heating of the materials is obtained which is particularly advantageous in connection with the evaporation of chromium and quartz, for example, or other metals or materials which do not melt prior to evaporation.

Another object of our invention is to provide improved means wherein a plurality of individual heated receptacles for the metals or other materials are employed and wherein each of the receptacles is provided with independent means located adjacent to and above the receptacles for confining the movement of the evaporated molecules or particles to the predetermined area and to thus control the spread of such evaporated particles to a predetermined limit or area during the deposition thereof on the surface of the article being coated.

Another object of our invention is to provide metal and other material-receiving and evaporating receptacles and superimposed lid members which will permit the evaporation of silver, lead, magnesium fluoride and other materials in fairly large quantities and permit the evaporation of these and other materials which do not properly wet or spread on the filaments and which have thus in the past been difficult to evaporate and to secure uniform deposits of.

A further object of our invention is to provide a means for depositing materials within desired partial areas upon an object so as to produce simple pattern effects and to permit the deposition of several types of coatings or mirror films upon a single support in adjacent relationship.

Another object of our invention is to provide means for using powdered materials, such as magnesium fluoride, directly without the need of compressing such into pellets or prefusing the same.

As a still further object means are provided such that evaporation of exact amounts of materials, such as powdered magnesium fluoride or granular substances such as chromium, may be carried out without losses so as to produce deposits of definite desired and controlled thickness.

The foregoing and other objects and advantages of our invention will appear from the following description and appended claims when considered in connection with the accompanying drawings forming a part of this specification wherein like reference characters designate corresponding parts in the several views.

Figure 1:
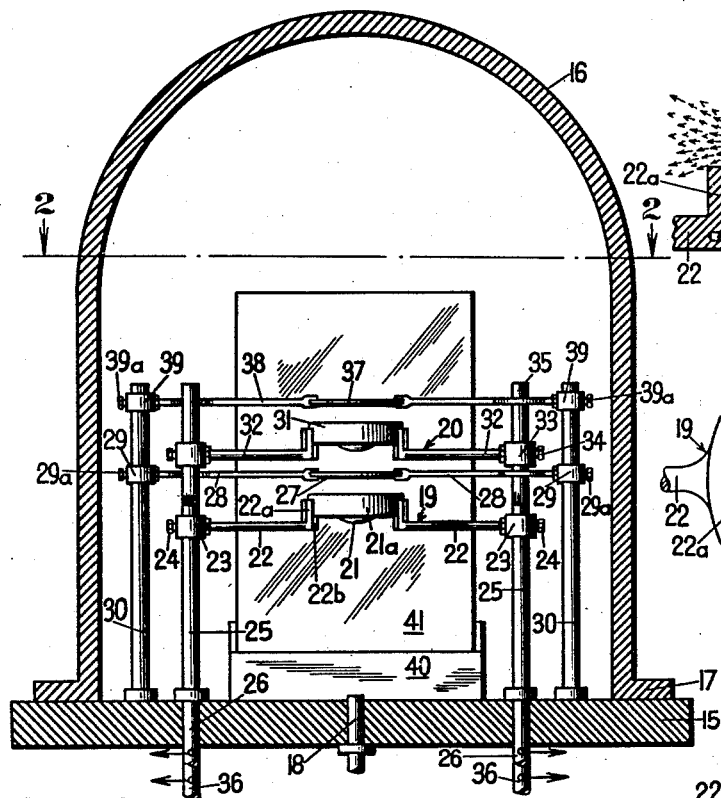
Figure 1 is a vertical sectional view, partly in elevation, of suitable means or an apparatus for performing the method of our invention.

Before explaining in detail the present invention, it is to be understood that the invention is not limited in its application to the details of construction and arrangement of parts illustrated in the accompanying drawings since the invention is capable of other embodiments and of being practiced or carried out in various ways. Also, it is to be understood that the phraseology or terminology herein employed is for the purpose of description and not of limitation, and it is not intended to limit the invention claimed herein beyond the requirements of the prior art.

Referring now to the drawings and particularly to Figures 1 to 5, inclusive, thereof, there is shown in these figures one form of means or apparatus for evaporating metals and other materials in accordance with our invention.

Figure 2:
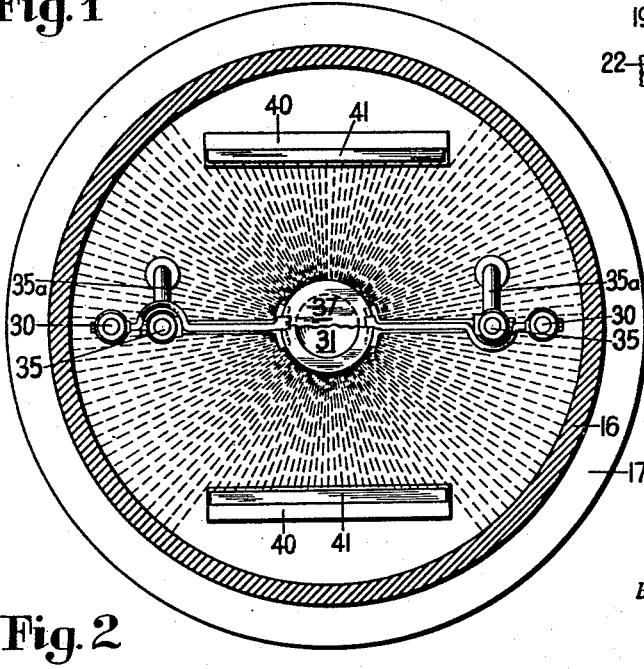
Figure 2 is a horizontal sectional view taken substantially along the line 2—2 of Figure 1, looking in the direction of the arrows.

The apparatus shown in Figures 1 and 2 comprises a base 15 upon which is removably mounted a housing or bell-like casing 16 having at its lower end thereof a surrounding projection or flange 17 which rests upon the top surface of the base 15. The base 15 is, as shown, provided centrally thereof with an exhaust pipe or conduit 18 which is in communication with the chamber formed within the housing and which is preferably connected with suitable pumps (not shown) for evacuating the chamber and creating a vacuum therein.

As seen in Figure 1, the chamber contains a pair of heated material or metal evaporating units positioned one above the other, one such unit being shown as a whole at 19 and the other unit superimposed above it, being shown as a whole at 20. The unit 19, as shown, and the unit 20, as shown, are identical. The unit 19 comprises a pot or cup-like portion 21 having a surrounding flange 21a to which is clamped a pair of horizontally disposed arms 22 whose outer ends are provided with ring members or collars 23 and adjustment screws 24. The collars 23 are telescoped over upright posts 25 which are mounted upon the base 15 and which receive lead-in wires or electrodes 26 extending from a suitable source of electric current. The arms 22 are maintained in any desired position with relation to the base by the set screws or bolts 24 threaded into the collars 23 and adapted to engage the posts 25.

Figure 3:
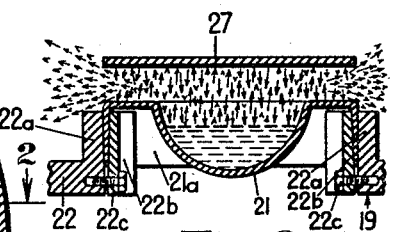
Figure 3 is a fragmentary detail vertical sectional view of one of the evaporating units embodying our invention.
Figure 4:
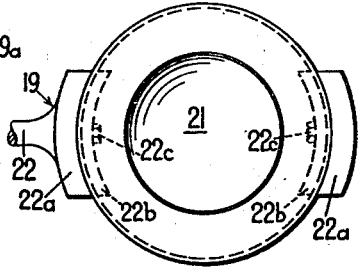
Figure 4 is a top plan view thereof.
Figure 5:
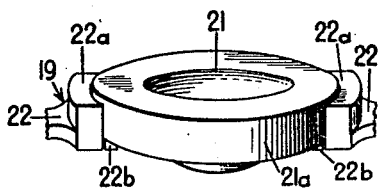
Figure 5 is a perspective view of the unit shown in Figures 3 and 4.

As best seen in Figures 3 and 4, the inner end portions of the members 22 are enlarged and of arcuate shape as shown at 22a and each arcuate end is provided with a removable similarly shaped clamping plate or member 22b which is held to the portion 22a by a screw or bolt 22c. Thus, it will be seen, that the depending flange 21a of the pot or cup-like member 21 is held in clamped position between the members 22a and 22b. By tightening the screws or bolts 22c to grip the flange 21a, the pot or evaporating receptacle 21 will be rigidly supported in the position in which it is shown in Figure 1. It will be understood that the electric leads 26 are suitably connected to the horizontally disposed arms 22 of the evaporating unit and thus provide electrical current to said arms and to the receptacle or pot member 21. It is to be understood that the receptacle 21 has a maximum of electrical resistance and that the electrical resistance of the receptacle is always in excess of that of the supporting arm 22.

The receptacle or material-receiving and evaporating pot 21 is provided with a spaced lid or cover 27 which is grippingly supported at its opposed peripheral portions by the inner ends of a pair of horizontally disposed arms or members 28 whose outer ends are provided with annular collars 29 telescoped over and slidably mounted upon upright supporting posts 30 mounted upon the base 15. Suitable set screws or bolts 29a are provided for maintaining the lid in its desired adjusted position with relation to the evaporating receptacle 21.

The evaporating unit 20 likewise comprises a centrally disposed and supported receptacle or pot-like member 31 mounted upon horizontally disposed arms or rods 32 whose outer ends are provided with collars 33 having adjusting and locking screws or bolts 34 threaded thereinto. The collars 33 are telescoped over and movable along a pair of upright supporting posts 35 which are curved at 35a, see Figure 2, so that their upper end portions overlie the upper ends of the supporting posts 25 so that the receptacle 31 will be located centrally of the housing and directly above the pot 21 and lid or cover 27 therefor. Suitable lead-in wires or electrodes 36 are in electrical contact with the horizontally disposed arms or members 32 and through said arms with the receptacle or pot-like member 31. It is to be understood that the evaporating unit 20 is similar to the unit 19 in all respects but is mounted upon separate and independent supporting posts 35 and has separate and independent electrical current furnished to it through the wires or electrodes 36.

The pot-like member 31 is provided with its own cover or lid member 37 whose periphery at opposed points is grippingly engaged by a pair of horizontally disposed supporting members 38, similar to the members 28, and whose outer ends are provided with collars or annular members 39 having set screws or bolts 39a for supporting the arms and the lid or cover 37 in the desired adjusted horizontal position with relation to the receptacle 31, it being understood that the collars 39 are telescoped over and slidable along the upright supporting posts 30.

It is to be understood that while the evaporating unit 19 is provided with electrical current to heat the pot-like member 21 thereof and while the superimposed unit 20 is provided with a separate source of electrical energy to heat the pot-like receptacle 31, the lids 27 and 37 and their supporting arms 28 and 38, respectively, are not electrically connected and therefore are not heated. The two units 19 and 20 may also be in the same electrical circuit, if desired. The lids 27 and 37 may also be independently heated, if desired.

As seen in Figure 2, a pair of article supports 40 are mounted in suitable manner upon the base 15. These supports are located at opposite sides of the evaporating units and each of them serves to support a workpiece or article, such as a piece of glass 41. The articles are supported in substantially vertical positions.

The receptacles of members 21 and 31 are preferably formed by the die-shaping method and apparatus or by any other suitable means from some suitable metal with preferably a high melting point. One such metal which is especially adapted for the purpose is tantalum. Other metals such as tungsten, molybdenum, columbium, Chromel, nickel, stainless steel, et cetera, may be used for this purpose, the choice depending upon the evaporating temperature of the material to be evaporated. Thus, we may readily use stainless steel receptacles and lids when we are evaporating lead but if we desire to evaporate copper or silver or magnesium fluoride we prefer to use tantalum. In fact, carbon in the form of graphite has been found to be a particularly useful material from which the receptacles may be formed due to its high heat resistance and easy machinability. It will be understood that the lids 27 and 37 may be formed from similar kinds of metal or other materials such as those used to form the receptacles.

In accordance with our invention where the lids and receptacles are of relatively simple form which do not require much shaping in their production, fused silica, thoria and magnesium oxide, for example, have been found to be suitable materials from which they may be formed. Receptacles of such materials must be heated by resistance coils wrapped around such or heated by induction heating.

In accordance with the method of our invention which may be performed with the apparatus shown in Figures 1 to 5, inclusive, some suitable material which it is desired to evaporate such as a metal or metals or other materials, for example, silver, gold, aluminum, copper, chromium, platinum, lead, rhodium or the like, or quartz or the like, or a fluoride such as calcium or magnesium fluoride, is placed within an evaporating receptacle such as 21 which is thereafter heated within a vacuum to bring about thermal evaporation.

Specifically in accordance with one method embodying our invention this may be performed in the apparatus shown in Figures 1 to 5, inclusive. A metal such as silver may be placed within a receptacle 21 which may be made of tantalum and more silver or another material, for example, quartz, may be placed in the other receptacle 31 which also may be made of tantalum. After the metals or other materials have been placed in the receptacles, articles to be coated, such for example as the clear glass pieces 41 and possibly other similar pieces are placed in position upon their respective supports 40 at the side of the evaporating source. The casing 16 is now placed in position and the chamber within the casing is evacuated by operating suitable pumps (not shown) connected with the exhaust or outlet pipe or conduit 18 to create a high vacuum within the chamber.

After the vacuum has been created, current is supplied to the evaporating units 19 through the wires for electrodes 26 to heat the receptacle or pot-like member 21 to cause the metal located therein to evaporate and to be thrown off onto the face surfaces of the glass pieces 41. In Figure 3 of the drawings the movement of the molecules or particles of evaporated metal is indicated by the arrows shown in this figure. It will be noted that the molecules or particles of evaporated metal evaporating vertically impinge against the under surface of the lid or cover 27 and bounce back and forth until they have passed through the throat portion between the receptacle 21 and the lid and are thrown from the throat portion onto the articles to be coated which are placed at the sides. Obviously, spitting metal or material chunks which are thrown vertically against the lid cannot escape from the evaporating chamber since they remain adhered to the lid.

It will be understood that the length of the throat portion between the receptacle 21 and its lid 27 will determine the amount of spread of the metal or material molecules as they are thrown out in radial directions by the unit 19, the longer the throat, the narrower the spread of the molecules and the shorter the throat the wider the spread of the molecules. By adjusting the vertical distance between receptacle 21 and its lid or cover 27 on their respective supporting posts, the width of the spread of the molecules may also be regulated or controlled. The adjustment is made to accommodate the desired spread of the molecules dependent upon the size of the article or articles whose surface or surfaces are to be coated. The distance between the workpieces or articles and the evaporating units may also be varied.

After the silver in the receptacle 21 has been evaporated and deposited upon the face surfaces of the article 41, current is supplied to the evaporating unit 20 through the wires 36 to evaporate the silver or quartz within the receptacle 31 to cause the molecules or particles thereof to bounce back and forth in the manner indicated by the arrows in Figure 3 until they are discharged in radial directions through the throat portion of the unit provided by the receptacle 31 and its lid or cover 37. As in the case of the unit 19, the parts of unit 20 may be adjusted relatively to one another to vary the size of the throat or opening to thus control or regulate the amount of spread of the molecules issuing from the throat.

Thus, where we employ silver in both receptacles we produce by so coating glass sheets 41 silver mirrors and by suitably arranging the two evaporating assemblies and using silver in the assembly 19 and thereafter evaporating quartz from the assembly 20 we secured silver mirrors having a protective coating of quartz thereon. It is obvious that in some cases we may evaporate from a single receptacle and lid assembly two or more materials.

If it is desired to evaporate additional metals or other materials within the apparatus it will be understood that additional evaporating units such as the units 21 and 31 may be provided in superimposed relationship to those units or additional units may be staggered or otherwise placed within the chamber. Thus, several materials may successively or simultaneously be evaporated each from a receptacle and lid assembly, to give products carrying several successive coating layers as have become desirable in producing some mirrors and low reflection coatings or to give joint deposits of materials such as the forming of a joint or alloy deposit of several metals. It is to be understood that in the evaporation of the different metals or other materials we subject them to various degrees of heat necessary to evaporate each material and we may carry out successive evaporations in the same chamber without breaking the vacuum therein and to cause the molecules of evaporated metals or other materials to deposit successively on the surfaces of the articles located within the apparatus. By proper regulation of the amount of current applied to different evaporation receptacles, we may control the composition of joint deposits being laid down by simultaneous evaporation from the several receptacles.

While the use of separate electrical resistance circuits for the heating of the several receptacles is preferable it is apparent that we may have several of these upon one circuit where the various materials to be evaporated require approximately the same temperatures for evaporation. The current may be A. C. or D. C. and three phase current may also be applied for heating as well as ordinary two phase current but in such cases a third electrode is necessary, and by bringing such third electrode into the apparatus as a point contact connection under the depression or cup part of the receptacles very rapid heating may be secured. The contact areas in the faces of the parts 22a and 22b are purposely made fairly wide and carried considerably around the periphery of the cup or other receptacle 21 to avoid having a high resistance at these points of support which might lead to local burning out of the assembly at such points. Generally also it is desirable with our various forms of receptacles that for electrical resistance heating the cup section of the receptacle have a litle higher electrical resistance than its adjacent supporting parts so that maximum heating or hot spot conditions develop in the areas carrying the material to be evaporated. On the other hand the amount of metal and consequent electrical current carrying capacity at any cross section of the receptacle at right angles to the direction of the electrical current flow must be kept fairly closely uniform in order to avoid such hot spot heating developing to the point of locally burning the metal through and thus breaking down.

It is apparent that when our lid is not directly heated it becomes heated to a considerable degree due to its closeness to the heated receptacle and the high amount of radiant heat thus taken up by the lid. While the lid is thus obviously heated it is also necessarily cooler than the receptacle and the material evaporating but the condensation of evaporated material on the lid is relatively unimportant when the receptacle is sufficiently heated.

The lid may also be heated to a desired temperature and other novel and desirable effects thereby secured. We have found that materials such as quartz which have very high evaporation temperatures in a vacuum and which do not melt and are thereby hard to heat because of the poor thermal contact secured are readily evaporated out of our receptacle and lid assemblies as the practically enclosed space therein represents a high temperature radiant energy trap and the quartz and other solids placed in such assemblies rapidly become highly heated by the radiant energy falling from them from all sides as high temperature radiation.

From Figure 3 it will be seen that the collimating effect of the throat formed by the flange or collar on the receptacle and the lid causes a uniform radial distribution to the side and that this produces a very uniform deposition or coating. In this figure, the throat is of equal length in the various radial directions and the lid dimensions match with the periphery of the receptacle collar. Obviously as will be shown in other forms of our assemblies of lids and collars attached to receptacles the dimensions of the lids and collars may be different and the lengths of throat may be varied in different directions as well. Such arrangements will give deposits upon various shaped inclusive areas and in many cases the deposits will not be entirely uniform over such areas as when using our preferred form as shown in Figure 3 but they have found many special uses.

Figure 6:
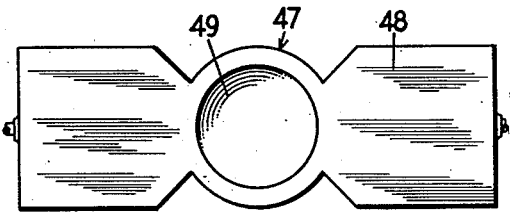
Figure 6 is a top plan view of a modified form of evaporating receptacle in accordance with our present invention.

Referring now to Figure 6 of the drawings, there is shown a modified form of evaporating receptacle embodying our invention. The receptacle is shown as a whole at 47 and comprises a body portion 48 of generally oblong shape having a centrally disposed depression or cup-like portion 49 for receiving the metal or other material to be evaporated. The receptacle 47 may be formed from any suitable metal, such as tantalum, or from carbon, if desired. The receptacle 47 is adapted to be mounted within a vacuumized chamber in any suitable manner and is heated by the application thereto of an electric current or, if desired, may be heated by induction. It is to be understood that the receptacle 47 is used in the same manner as the previously described receptacle and in connection with a suitable spaced lid or cover member (not shown) which may either match the unit 47 in outer contour or overlap the same.

Figure 7:
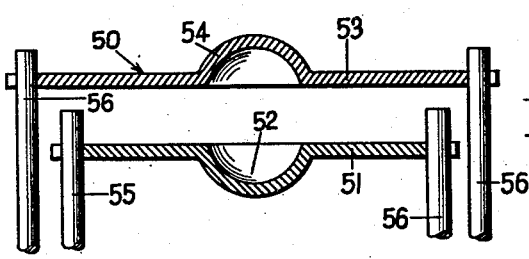
Figure 7 is a vertical sectional view of a modified form of evaporating unit.

Referring now to Figure 7 of the drawings, a further modified form of evaporating unit is shown as a whole at 50. This unit comprises a receptacle 51 having a centrally disposed depression 52, and a cover member or lid 53 having a dome-like centrally disposed portion 54 which, when the parts are assembled, is located above the receptacle depression 52.

As shown, the receptacle 51 is provided with suitable holes for receiving suitable posts 55. The cover or lid 53 is similarly provided with holes and is supported above the receptacle 51 by means of suitable supporting posts 56. It will be understood that the receptacle 51 is adapted to be electrically heated in substantially the same manner as are the receptacles of the preceding views.

In very high vacuums it has been found that the evaporated molecules travel in a straight line from the evaporating source provided they do not hit upon any of the few residual air molecules which might be present. In poor vacuums where such encounters are fairly frequent, some of the evaporated molecules are deflected slightly and will give faint deposits outside of the primary areas where most of the molecules deposit. The use of high vacuums overcomes this and it is found that molecules evaporating from the preferred assemblies set out will deposit within definite areas and that the edges of the deposits are quite sharp and not particularly fuzzy. Thus, it becomes possible by the use of our evaporating assemblies which have collimating throats to apply a mirror or other coating partially to the surface of the article such as a piece of glass while leaving the other parts of the article uncoated.

Figure 8:
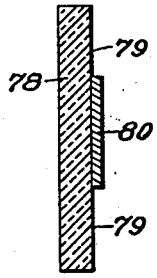
Figure 8 is an edge view of an article made in accordance with our invention.

In Figure 8 there is shown in cross section an article so produced, the support 78 being uncoated at areas 79 and coated at an area 80.

Figure 9:
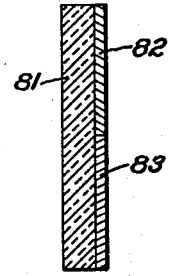
Figure 9 is a similar view of a modified form of article embodying the invention.

In Figure 9 there is shown a support article 81 which has had applied to it a coating 82 evaporated from one of our collimating evaporation assemblies and adjacent thereto there has been applied a second coating 83 of another material by a similar evaporation from a similar assembly suitably positioned in the chamber to cause the second deposit to fall adjacent the first as desired.

Figure 10:
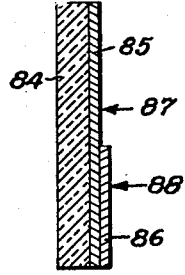
Figure 10 is a view similar to Figure 8 and Figure 9 showing a further modified embodiment comprising a mirror made by our invention.
Figure 11:
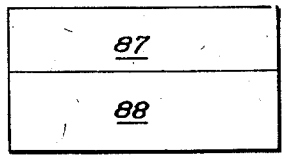
Figure 11 is a front elevational view of the article shown in Figure 10.

Further, as shown in Figures 10 and 11, by the use of our evaporation assemblies we may also deposit uniformly over the entire surface of an article 84, such as a piece of glass or plastic, a coating of one material such as a reflective coating of silver 85 and then by suitably positioning a second evaporation assembly evaporate onto this a reflective coating 86 of another material, such as lead sulfide and deposit the lead sulfide only on a desired portion so as to produce a mirror which on one piece of glass appears as a silver mirror 87 and in other portions as a lead sulfide mirror 88.

Obviously, in a similar way we may deposit several coatings upon partial areas of a support article, such as glass, in which the various deposits overlap or underlie each other in portions or as a whole and the patterned areas of each do not at all necessarily coincide one with another.

While the use of the various assemblies and evaporating receptacles shown and heretofore described are made with collars giving uniform radial throats or apertures, it is obvious that the collars may be undulated or even carry restrictions which will vary the dimensions of the throat at the various parts around its prepihery. In such a way it is quite simple to produce a coating upon an article which at its edges would be of scalloped form (not shown).

Our assemblies for evaporation have been found particularly suitable for the evaporation of rhodium since the deposit of this highly expensive material is thus restricted to the areas desired to be coated and none is wasted on the walls of the chamber or other parts of the apparatus. The ability to evaporate considerable amounts of material and to evaporate materials which normally gave difficulties because of poor wetting of filaments has been of particular importance in the evaporation of silver for forming large mirrored areas and in the evaporation of magnesium fluoride in the coating of optics to secure low reflection and high transmission of light. In saving rejections in such operations by eliminating spitting our evaporation assemblies have eliminated costly loss of effort and wastage of expensive optical elements desired to be coated and with the uniformity of deposit secured by us the operation of thermal evaporation has been placed upon a sure commercial basis of consistent production without wastage. Furthermore, it is not at all necessary to pellet powdered materials such as magnesium fluoride as is necessary in using filaments as our evaporation receptacles may be charged with the powdered or granular material.

From the foregoing it will be seen that we have disclosed novel apparatus for producing surface coatings by the thermal evaporation of different metals or other materials and various types of evaporating units which are adapted to be employed with such apparatus. By virtue of our invention, different materials may be successively evaporated in a highly vacuumized chamber to cause the successive deposition of the materials in the form of successive coatings upon the surfaces of articles within the vacuumized chamber. Various kinds of metal and other materials may be evaporated by means of our improved apparatus and the evaporating units may be formed from various metals and other materials, some of which have been mentioned above. Furthermore, by virtue of our invention we may carry out depositions upon articles placed to the side or below the evaporation source and can do so without wastage of expensive materials and, more important, troublesome defective work due to spitting is eliminated.

Having thus described our invention, what we claim is:

1. An apparatus for thermal evaporation of materials in a vacuum and for restricting deposition of the evaporated material to predetermine defined areas at the side of such apparatus, comprising a vacuum chamber, thermal evaporating means located within the chamber, said evaporating means comprising a metallic cup-like material-receiving receptacle heated by passage of an electric current through its body and having an outwardly projecting peripheral flat flange of a length several times greater than the wall imposed cover matching in overall dimensions thickness of said cup-like receptacle, and a superimposed cover matching in overall dimensions said cup and flange, said cover being located at all times during thermal evaporation above and closely adjacent to said receptacle, said receptacle flange and superimposed cover outer portion being arranged substantially parallel and in horizontal position and together providing a horizontal peripheral throat as a vapor outlet for said evaporating means, the length of said throat and the separation of said flange and superimposed cover portion restricting the deposition within the predetermined defined areas.

2. An apparatus for thermal evaporation of materials in a vacuum and for restricting deposition of the evaporated material to predetermined defined areas at the side of such apparatus, comprising a vacuum chamber, thermal evaporating means located within the chamber, said evaporating means comprising a material-receiving receptacle in the form of a cup having an outwardly projecting peripheral flat flange of a length several times greater than the wall thickness of said cup, electrical means for heating said receptacle, and a superimposed cover of an area greater than the area of the upper end of said cup, said cover being located at all times during thermal evaporation above and closely adjacent to said receptacle, said receptacle flange and superimposed adjacent outer portion of the cover being arranged substantially parallel and in horizontal position and together providing a horizontal peripheral throat as a vapor outlet for said evaporating means, the length of said throat and the separation of said flange and superimposed cover portion restricting the deposition within the predetermined defined areas.

3. An apparatus for thermal evaporation of materials in a vacuum and for restricting deposition of the evaporated material to predetermined defined areas at the side of such apparatus, comprising a vacuum chamber, thermal evaporating means located within the chamber, said evaporating means comprising a material-receiving receptacle in the form of a cup having an outwardly projecting peripheral flat flange of a length several times greater than the wall thickness of said cup and a superimposed cover of an area greater than the area of the upper end of said cup, said cover being located at all times during thermal evaporation above and closely adjacent to said receptacle, and electrical means for heating the receptacle and receptacle flange, said receptacle flange and the superimposed adjacent outer portion of the cover being arranged substantially parallel and together providing a throat as a vapor outlet for said evaporating means, the length of said throat and the separation of said flange and superimposed cover outer portion restricting the deposition within the predetermined defined areas.

4. An apparatus for thermal evaporation of materials in a vacuum and for restricting deposition of the evaporated material to predetermined defined areas at the side of such apparatus, comprising a vacuum chamber, thermal evaporating means located within the chamber, said evaporating means comprising a cup-like material-receiving receptacle having an outwardly projecting peripheral flat flange of a length several times greater than the wall thickness of said cup-like receptacle and a superimposed flat cover matching in overall dimensions said cup and flange, electrical means for heating said receptacle, said cover being located at all times during thermal evaporation above and closely adjacent to said receptacle, said receptacle flange and superimposed adjacent cover outer portion being arranged substantially parallel and together providing a throat as a vapor outlet for said evaporating means, the length of said throat and the separation of said receptacle flange and superimposed cover restricting the deposition within the predetermined defined areas.

WILLARD L. MORGAN.
ARTHUR R. WEINRICH.

REFERENCES CITED

The following references are of record in the file of this patent:

UNITED STATES PATENTS

| Number | Name | Date |
|---|---|---|
| 2,074,281 | Sommer | Mar. 16, 1937 |
| 2,151,457 | Williams | Mar. 21, 1939 |
| 2,160,981 | O'Brien | June 6, 1939 |
| 2,273,941 | Dorn | Feb. 24, 1942 |
| 2,341,827 | Sukumlyn | Feb. 15, 1944 |
| 2,354,521 | Hewlett | July 25, 1944 |

FOREIGN PATENTS

| Number | Country | Date |
|---|---|---|
| 102,187 | Australia | Oct. 21, 1937 |
| 502,978 | Great Britain | Mar. 29, 1938 |

OTHER REFERENCES

Journal Applied Physics, Nov. 1941, pages 779–781.